UNITED STATES PATENT OFFICE.

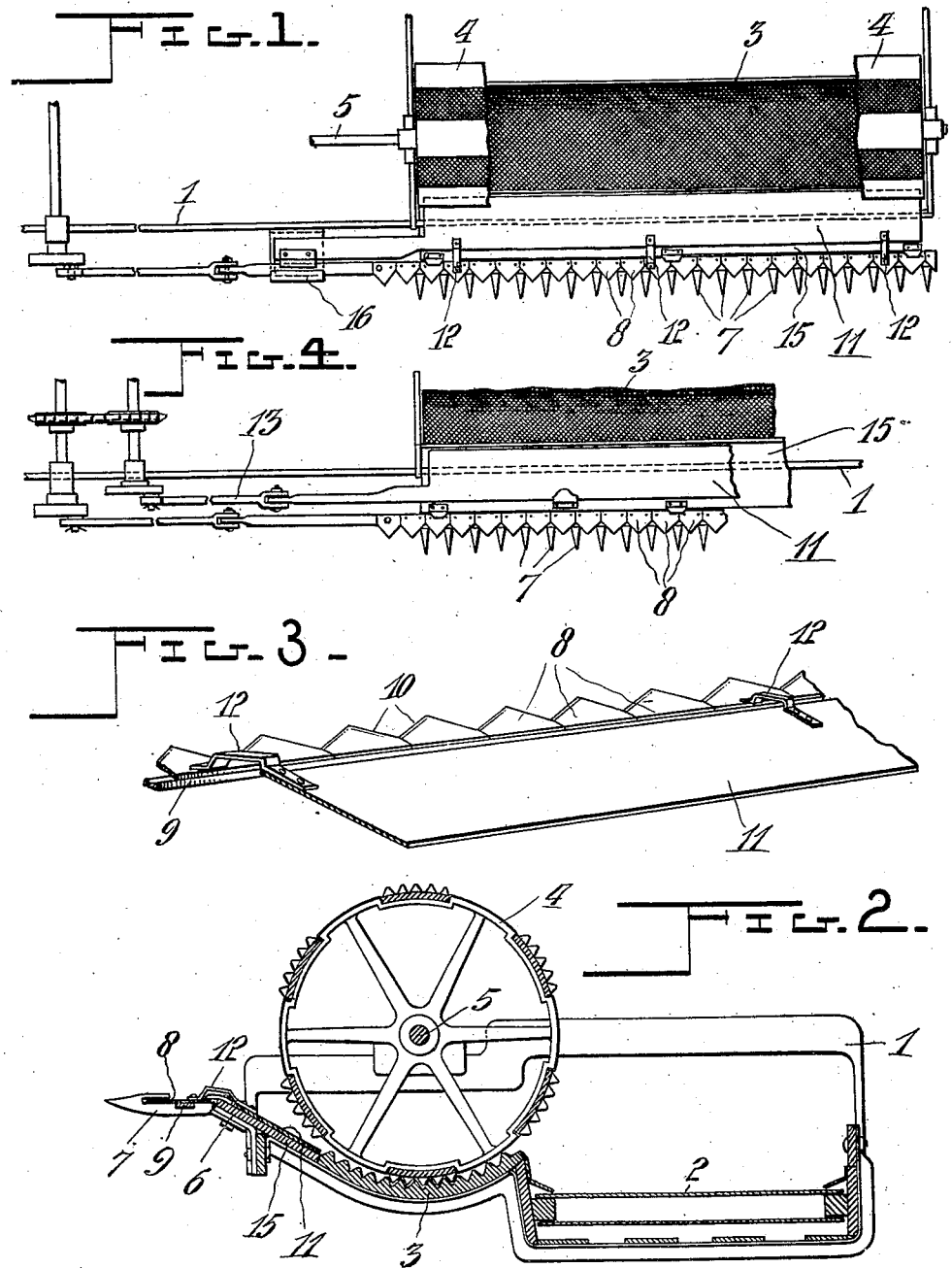

WILLIAM MALONEY, OF SMITH'S FALLS, ONTARIO, CANADA, ASSIGNOR OF ONE-HALF TO THE FROST AND WOOD COMPANY LIMITED, OF SMITH'S FALLS, ONTARIO, CANADA, A CORPORATION.

COMBINED CUTTING-KNIFE AND DISTRIBUTER FOR HARVESTING-THRESHERS.

No. 855,519.     Specification of Letters Patent.     Patented June 4, 1907.

Application filed May 11, 1905. Serial No. 259,905.

*To all whom it may concern:*

Be it known that I, WILLIAM MALONEY, a subject of the King of Great Britain, residing at Smith's Falls, county of Lanark, in the Province of Ontario, Canada, have invented certain new and useful Improvements in a Combined Cutting-Knife and Distributer for Harvesting-Threshers; and I do hereby declare that the following is a full, clear, and exact description of the invention, such as will enable others skilled in the art to which it appertains to make and use the same.

This invention relates to improvements in combined harvesting and threshing machines, and comprises means for rendering the operation thereof more certain in so far as the feeding of the grain to the threshing mechanism is concerned, and consists in certain features of novelty, all as hereinafter more fully described, and specifically pointed out in the claims.

The object of the invention is to provide a reciprocatory agitating plate between the cutting knife and a threshing concave, which is located on the machine behind said knife, and the machine with which the present improvements are designed to be used is adapted especially for use in cutting the tops only of standing grain.

Referring to the drawings, in which similar numerals of reference indicate corresponding parts in all the views, Figure 1 is a plan view of a fragmentary portion of a combined harvesting and threshing machine equipped with the present invention, with the threshing cylinder broken away to show the concave located therebelow. Fig. 2 is a transverse sectional view through the parts shown in Fig. 1. Fig. 3 is a perspective view of a cutting-knife, with the plate hereinafter referred to connected therewith, and Fig. 4 is a plan view of a modified form of arrangement, in which the cutting-knife and the reciprocatory plate hereinafter referred to are separately driven from independent actuating means, as may be sometimes desired.

Referring to the parts, 1 is the frame of the machine, in which is mounted an elevator 2, forwardly of which is the threshing concave 3 coöperating with which concave is the threshing cylinder 4, which is mounted upon the shaft 5 carried by the frame 1. Bolted or otherwise secured to the concave frame is a bracket 6, which carries the knife guards 7, and reciprocatory in said knife guards is a cutting-knife 8, provided with the usual cutter-bar 9 and cutting-blades 10. Coöperating with the cutting-knife 8, and between said cutting-knife and the concave referred to, is a plate 11, which extends parallel with the cutting-knife. The plate 11 may be connected with the cutting-knife by means of connecting members 12, as shown in Figs. 1, 2 and 3, so as to reciprocate longitudinally of the threshing cylinder with the movement of said knife, or said plate may be independently actuated, as by means of a separate pitman 13 if desired, and either construction will be within the spirit of the present invention.

As will be noted in the sectional view, Fig. 2, the plate 11 is supported upon the bed-plate 15, which extends obliquely, forwardly and upwardly of the threshing concave, and the plate 11 extends from the rear edge of the cutting knife 8 to the forward edge of said concave, thereby filling the intervening space, and at the same time providing a distributer or agitator upon which the cut grain may pass, after leaving the cutting-knives, and be carried to the concaves and threshing cylinder, and during its passage from the cutting-knife to said concave, the grain will be evenly distributed over the surface of said plate 11, and consequently be evenly fed into the threshing means.

A great advantage results from having the plate 11 carried at an angle extending rearwardly and downwardly from the cutting-knife, as the feeding of grain to the threshing means is positively secured. Suitable guides 16 are provided for the cutting-knife, and said plate 11, to hold the same in correct alinement.

During the operation of the machine, the cutting-knife and said reciprocatory plate are caused to travel transversely of the machine, as is well understood, through any desired actuating means, which form no part of the present invention.

Having described my invention, what I claim and desire to secure by Letters Patent is:—

1. In a combined harvesting and threshing machine, the combination comprising a reciprocatory cutting knife, supporting means therefor, threshing means in the rear of the knife, and a reciprocatory plate extending obliquely downward from the knife to the threshing means.

2. In a combined harvesting and threshing machine, the combination comprising a reciprocatory cutting knife, supporting means therefor, threshing means in the rear of the knife and a reciprocatory plate connected with the knife and extending obliquely downward, and located between the knife and the threshing means.

3. In a combined harvesting and threshing machine, the combination comprising a reciprocatory cutting knife, supporting means therefor, threshing means in the rear of the knife, and a reciprocatory plate extending obliquely downward from the knife and located between the knife and the threshing means, and means for reciprocating the knife and the plate.

4. In a combined harvesting and threshing machine, the combination comprising a reciprocatory cutting knife, supporting means therefor, threshing means relatively in the rear of said knife, and a reciprocatory plate carried with and at a downward and backward angle to said knife, between the knife and threshing means.

5. In a combined harvesting and threshing machine, the combination comprising a reciprocatory cutting-knife, supporting means therefor, threshing means relatively in the rear of said knife, and a reciprocatory plate connected with said knife and extending rearwardly and downwardly therefrom.

6. In a combined harvesting and threshing machine, the combination comprising a reciprocatory cutting-knife, supporting means therefor, threshing means relatively in the rear of said knife, and a reciprocatory distributing means extending longitudinally of said knife between said knife and said threshing means.

7. In a combined harvesting and threshing machine, the combination comprising a reciprocatory cutting-knife, supporting means therefor, threshing means relatively in the rear of said knife and extending substantially parallel therewith, and an inclined reciprocatory plate between said knife and said threshing means.

8. In a combined harvesting and threshing machine, the combination comprising a reciprocatory cutting knife, supporting means therefor, threshing means in the rear of said knife and extending parallel therewith, and a reciprocatory plate connected with said knife and extending obliquely downward therefrom and located between the knife and the threshing means.

9. In a combined harvesting and threshing machine, the combination comprising a reciprocatory cutting knife, supporting means therefor, threshing means in the rear of said knife and extending substantially parallel therewith, a reciprocatory plate disposed between said knife and said threshing means and extending obliquely downward from said knife, and means for actuating said plate.

10. In a combined harvesting and threshing machine, the combination comprising a reciprocatory cutting-knife, supporting means therefor, threshing means relatively in the rear of said knife and extending substantially parallel therewith, and a reciprocatory plate carried at a downward and backward angle to said knife, between the knife and said threshing means.

11. In a combined harvesting and threshing machine, the combination comprising a reciprocatory cutting-knife, supporting means therefor, threshing means relatively in the rear of said knife and extending substantially parallel therewith, and a reciprocatory plate connected with said knife and extending rearwardly and downwardly therefrom.

12. In a combined harvesting and threshing machine, the combination comprising a cutting knife, supporting means for the cutting knife, threshing means disposed adjacent to and at a lower plane than the knife, a plate inclined downward from the knife and adapted to bridge the space between the knife and the threshing means, and means for reciprocating the knife and the plate.

In witness whereof I have hereunto set my hand in the presence of two witnesses.

WILLIAM MALONEY.

Witnesses:
R. J. WHYTE,
JOHN McEWEN.